US010670859B2

(12) United States Patent
Logiudice et al.

(10) Patent No.: US 10,670,859 B2
(45) Date of Patent: Jun. 2, 2020

(54) HIGH EFFICIENCY DIGITAL LIGHT PROCESSING ENGINE

(71) Applicant: Infineon Technologies AG, Neubiberg (DE)

(72) Inventors: Andrea Logiudice, Padua (IT); Fabrizio Cortigiani, Padua (IT)

(73) Assignee: Infineon Technologies AG, Neubiberg (DE)

( * ) Notice: Subject to any disclaimer, the term of this patent is extended or adjusted under 35 U.S.C. 154(b) by 152 days.

(21) Appl. No.: 14/984,850

(22) Filed: Dec. 30, 2015

(65) Prior Publication Data

US 2017/0192224 A1 Jul. 6, 2017

(51) Int. Cl.
| | | |
|---|---|---|
| *F21V 7/00* | (2006.01) | |
| *G02B 26/08* | (2006.01) | |
| *F21S 41/141* | (2018.01) | |
| *F21S 41/25* | (2018.01) | |
| *F21S 41/663* | (2018.01) | |
| *F21S 41/675* | (2018.01) | |

(Continued)

(52) U.S. Cl.
CPC ......... *G02B 26/0833* (2013.01); *B60Q 1/085* (2013.01); *F21S 41/141* (2018.01); *F21S 41/25* (2018.01); *F21S 41/663* (2018.01); *F21S 41/675* (2018.01); *G03B 21/008* (2013.01); *H05B 45/00* (2020.01); *H05B 45/10* (2020.01); *H05B 47/105* (2020.01); *B60Q 2300/056* (2013.01); *B60Q 2300/30* (2013.01); *F21Y 2115/10* (2016.08)

(58) Field of Classification Search
CPC .............. G02B 26/0833; G03B 21/008; H05B 33/0854; H05B 37/0227; B60Q 2300/056; B60Q 2300/30; B60Q 1/085; F21Y 2115/10; F21V 14/04; F21V 7/0066; F21V 7/0083; F21S 48/125; F21S 48/1757; F21S 48/14; F21S 48/115; F21S 48/13; F21S 48/1241; F21S 48/328

See application file for complete search history.

(56) References Cited

U.S. PATENT DOCUMENTS

| 8,642,363 B2 | 2/2014 | Lau et al. |
| 2002/0196636 A1 | 12/2002 | Dassanayake et al. |
| (Continued) | | |

FOREIGN PATENT DOCUMENTS

| CN | 101477246 A | 7/2009 |
| CN | 103672747 A | 3/2014 |
| (Continued) | | |

OTHER PUBLICATIONS

Herrnsdorf et al., "Active-Matrix GaN Micro Light-Emitting Diode Display With Unprecedented Brightness," IEEE Transactions on Electron Devices, vol. 62, No. 6, Jun. 2015, pp. 1918-1925.

(Continued)

*Primary Examiner* — William J Carter
*Assistant Examiner* — Omar Rojas Cadima
(74) *Attorney, Agent, or Firm* — Shumaker & Sieffert, P.A.

(57) ABSTRACT

Systems and methods are disclosed for a pixelated light source that includes a plurality of pixels; a plurality of digital micromirrors configured to receive input light from the pixelated light source and configured to modify the input light to generate output light; and one or more controllers configured to control both the pixelated light source and the plurality of digital micromirrors to condition the output light.

22 Claims, 10 Drawing Sheets

(51) Int. Cl.
*H05B 45/00* (2020.01)
*H05B 45/10* (2020.01)
*H05B 47/105* (2020.01)
*B60Q 1/08* (2006.01)
*G03B 21/00* (2006.01)
*F21Y 115/10* (2016.01)

(56) References Cited

U.S. PATENT DOCUMENTS

| | | | |
|---|---|---|---|
| 2003/0138132 A1* | 7/2003 | Stam | B60Q 1/085 382/104 |
| 2006/0268236 A1* | 11/2006 | Prince | H04N 9/3111 353/31 |
| 2007/0280503 A1* | 12/2007 | Kubota | B60Q 1/50 382/103 |
| 2008/0130302 A1* | 6/2008 | Watanabe | B60Q 1/085 362/466 |
| 2014/0071704 A1 | 3/2014 | Yagi | |
| 2015/0160454 A1* | 6/2015 | Bhakta | F21S 48/1145 362/513 |
| 2015/0377445 A1* | 12/2015 | Chuang | B60Q 1/143 362/465 |
| 2016/0090023 A1* | 3/2016 | Asaoka | B60Q 1/085 345/697 |

FOREIGN PATENT DOCUMENTS

| | | |
|---|---|---|
| DE | 19737653 A1 | 3/1999 |
| DE | 102010048659 A1 | 4/2012 |
| JP | 2008100541 A | 5/2008 |
| JP | 2015222687 A | 12/2015 |
| WO | 2015089018 A1 | 6/2015 |

OTHER PUBLICATIONS

Lee, "DMD 101: Introduction to Digital Micromirror Device (DMD) Technology," Texas Instruments, Application Report, DLPA008A, Oct. 2013, 11 pp.

"Infineon LITIX Basic Automotive LED Drivers," Infineon, retrieved from http://www.mouser.com/new/infineon-technologies/infineon-automotive-led-driver/ on Dec. 30, 2015, 2 pp.

"Digital Light Processing," Wikipedia, the free encyclopedia, retrieved from https://en.wikipedia.org/w/index.php?title=Digital_Light_Processing&oldid=691353291, Nov. 19, 2015, 9 pp.

"LCD Projector," Wikipedia, the free encyclopedia, retrieved from https://en.wikipedia.orgfwfindex.php?title=LCD_projector&oldid=690306743, Nov. 12, 2015, 5 pp.

"Digital micromirror device," Wikipedia, the free encyclopedia, retrieved from https://en.wikipedia.orgfwfindex.php?%20title=Digital_micromirror_device&oldid=683739946, Oct. 2, 2015, 2 pp.

Office Action, in the German language, from counterpart German Application No. 102016125541.6, dated Jan. 30, 2019, 5 pp.

Office Action and Search Report, from counterpart Chinese Application No. 201611256984.5, dated Dec. 5, 2018, 8 pp.

\* cited by examiner

HIGH EFFICIENCY DIGITAL LIGHT PROCESSING ENGINE

TECHNICAL FIELD

This disclosure generally relates to lighting systems, such as those used, for example, in projectors and adaptive headlamps of vehicles.

BACKGROUND

Many consumer devices rely on light projection technology to display information or provide illumination. For example, entertainment systems, such as projectors and televisions, use light projection technology to display images. These types of devices typically require light projection that can deliver extremely high-resolution images having millions of pixels. Further, it is desirable for the light illumination system to provide high contrast (e.g., the maximum level of brightness versus the maximum level of darkness that the system can generate) to provide enhanced detail in the displayed image. Further, many of these devices, such as smartphones, laptops, and tablet computers, operate on battery power. Thus, it is desirable to provide a light projection system that is energy-efficient to maximize the battery life of the device.

As another example, vehicle headlights may use light projection technology to illuminate the path of the vehicle or the surrounding area. These types of devices typically make use of lower resolution light projection systems.

Several different types of light projection technologies exist, such as Digital Light Processing (DLP), liquid-crystal display (LCD), and LED matrixes. Each type of technology possesses particular advantages and disadvantages, making one more advantageous than another, depending on the field of use.

SUMMARY

In general, the disclosure describes systems and techniques for creating a high efficiency DLP engine. The system of this disclosure combines a pixelated light source with a digital light processing device for use in light projection systems, such as projectors, adaptive vehicle headlamps, and consumer electronics. The techniques described provide higher efficiency and higher contrast than traditional DLP systems and higher resolution than traditional LED and HDPE technology.

The disclosure further describes systems and techniques for creating an adaptive vehicle headlight system using the high efficiency DLP engine. The adaptive vehicle headlight system may sense road conditions, such as terrain and weather data, and dynamically adjust the illumination provided by the headlights of the vehicle to improve illumination of the roadway and surrounding terrain as well as reduce glare to the driver. Further, the adaptive vehicle headlight system may provide a glare-free high beam. Such a glare-free high beam may operate to permit a driver to use the "high beam" setting of a vehicle's headlights without causing glare to oncoming traffic. The glare free high beam may further operate so as to prevent glare to the driver due to reflection by road signs.

In one example, this disclosure describes a system comprising: a pixelated light source that includes a plurality of pixels; a plurality of digital micromirrors configured to receive input light from the pixelated light source and configured to modify the input light to generate output light; and one or more controllers configured to control both the pixelated light source and the plurality of digital micromirrors to condition the output light.

In another example, this disclosure describes a method comprising: emitting light from a pixelated light source having a plurality of pixels; receiving the light by a plurality of digital micromirrors, wherein each of the plurality of digital micromirrors comprises a first state and a second state; directing, by one of the plurality of digital micromirrors operating in the first state, a portion of the light to a projection lens; and directing, by one of the plurality of digital micromirrors operating in the second state, a portion of the light away from the projection lens.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1:
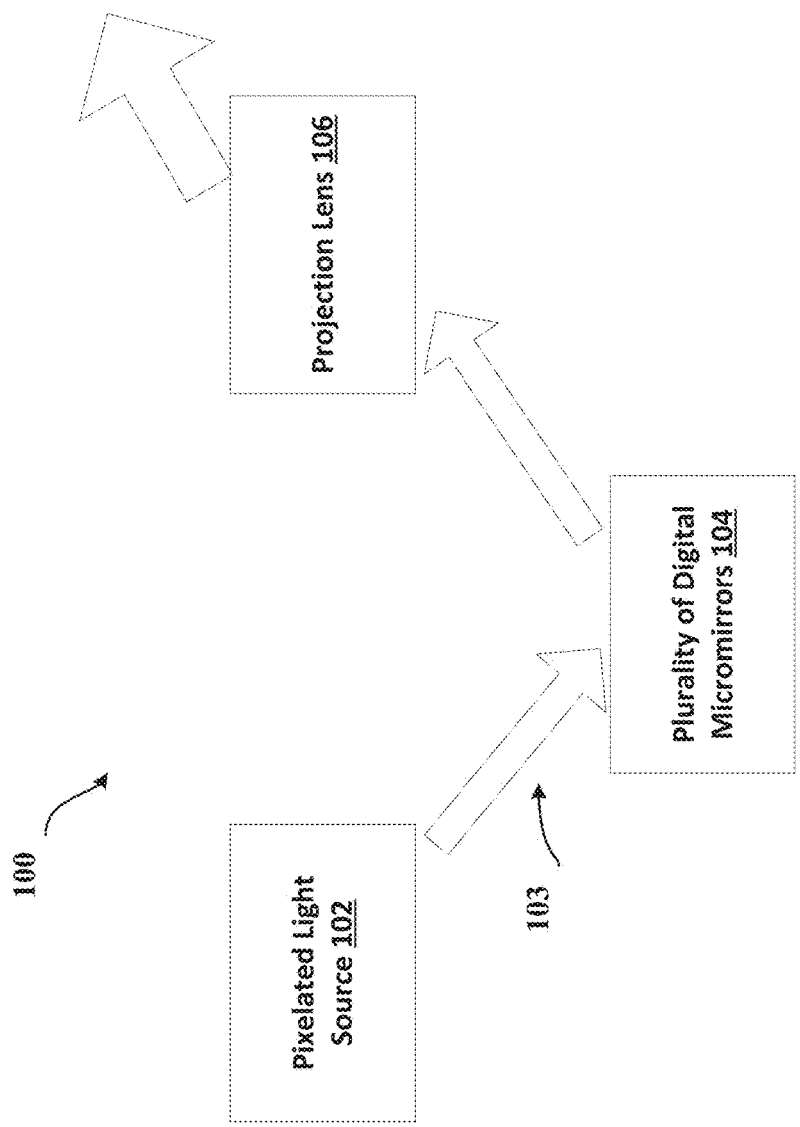
FIG. 1 is a block diagram illustrating an example light projection system in accordance with various examples of this disclosure.

Digital Light Processing (DLP) technology uses a matrix of micromirrors to reflect light from a single light source to a projection lens used to illuminate a pixel. Each micromirror is independently controllable and may be set to one of two states. In a first state, the micromirror is positioned such that light from the light source may be reflected by the micromirror to the projection lens. In this state, a pixel coupled to the projection lens would appear bright. In a second state, the micromirror is positioned such that light from the light source is reflected away from the projection lens. In this state, a pixel coupled to the projection lens would appear dark.

One advantage of DLP technology is that it allows higher resolution than other technologies. However, DLP technology suffers from lower overall efficiency because its light source is constantly on. Thus, DLP technology may be unsuitable for applications where power usage is a concern. Additionally, even when a micromirror is in the "off" state, some photons will still reach the projection lens. This photon leakage reduces the maximum "blackness" that the system may generate, effectively reducing the contrast of the system.

Another type of display is the LCD screen. LCD screens have very high resolution. However, LCD devices make use of polarizing filters for color selection. These filters absorb a large portion of the emitted light and reduce the efficiency of the device.

Yet another type of projection technology is the LED matrix, such as high-definition pixel engine (HDPE) technology. The advantage of an LED matrix is that one may select which LEDs in the matrix are on or off at any given moment, improving greatly efficiency over a similar DLP or LCD device. However, current LED matrices are limited to very low resolution (approximately 10,000 pixels). This makes an LED matrix unsuitable for any application requiring a precision display, such as consumer electronics, smartphones, and computer monitors.

A light-emitting diode (LED) projection system according to this disclosure may comprise a pixelated light source, a plurality of digital micromirrors, and a projection lens. The pixelated light source comprises a plurality of LEDs and provides light to a plurality of digital micromirrors. Each digital micromirror of the plurality of digital micromirrors comprises a first state, wherein at least a portion of the light is directed to the projection lens, and a second state, wherein at least a portion of the light is directed away from the projection lens. A micromirror controller may select between one of the first state and the second state of each of the plurality of digital micromirrors. The micromirror microcontroller may provide a map comprising a plurality of bright zones to a pixelated light source controller. The pixelated light source controller may selectively modulate at least one of the plurality of LEDs of the pixelated light source based on the map. The pixelated light source may further comprise one of an LED array, a high-definition pixel engine (HDPE), or a micro-Adaptive Frontlight System (uAFS) light source.

Thus, it may be seen that the system of this disclosure combines a pixelated light source with a digital light processing device for use in light projection systems, such as projectors, adaptive vehicle headlamps, and consumer electronics. The techniques described herein may provide higher efficiency and higher contrast than traditional DLP systems and higher resolution than traditional LED and HDPE technology.

The system of this disclosure may be suitable for many different types of light projection applications. Such applications may include home entertainment, such as projectors (whether for home, office, or theater environments). Such applications may further include consumer electronics, such as smart phones, personal digital assistants (PDA), laptops, computer monitors, tablet computers, and handheld gaming devices. Such applications may benefit from increased contrast, higher resolution, and decreased power consumption relative to conventional light projection technologies.

Additionally, the light projection system of this disclosure may be suitable for use in an adaptive vehicle headlight system. In some examples, the adaptive headlight system may make use of sensed road conditions to continuously adjust the projected illumination, so that the illumination remains correctly proportioned despite changes road conditions (e.g., changes in weather or terrain). Such an adaptive vehicle headlamp system may make use of the described light projection system to provide vehicle headlights having higher resolution, higher contrast, and improved energy efficiency relative to conventional lighting systems. Such a system may be used to dynamically adjust the projection of a vehicle's headlights in response to sensed road conditions. In some examples, the system may continuously measure road conditions, and then adjust the illumination of the headlights improve the effectiveness of the headlights. In some examples, such an adjustment may improve visibility of the roadway or surrounding terrain. In other examples, such an adjustment may reduce the glare to the driver (e.g., adjusting the headlights to reduce glare due to light reflected back at the driver by rain, snow, fog, other weather conditions, variations in terrain, or road signs). In some examples, such an adaptive vehicle headlight system may allow the vehicle headlights to project an image onto the roadway.

In some examples, the adaptive vehicle headlight system of this disclosure may provide a glare-free high beam. Such a glare-free high beam may operate to permit a driver to use the "high beam" setting of a vehicle's headlights without causing glare to oncoming traffic. In some examples, such a system may dynamically adjust the vehicle headlights to maximize illumination of the roadway without interfering with the ability of other drivers to see the road. In other examples, a glare-free high beam may dynamically adjust the vehicle headlights to maximize illumination of the roadway while reducing glare reflected to the driver by the illumination of roadway signs. Therefore, the adaptive vehicle headlight system of this disclosure may permit a driver to continuously use the "high beam" setting of the vehicle's headlights without causing glare to the driver or other vehicles on the roadway.

The adaptive vehicle headlight system set forth in this disclosure may be suitable for any type of vehicle, for example, automobiles, such as cars, trucks, and sport utility vehicles (SUV), watercraft and ships, aircraft, military vehicles, such as tanks, jeeps, and half-tracks, amphibious vehicles, transportation vehicles, such as semi-trucks and trailers, construction vehicles, such as bulldozers, tractors, backhoes, and cranes, heavy machinery, trains, motorcycles, recreational vehicles such as golf carts, dune buggies, and all-terrain vehicles (ATV), unpowered vehicles, such as bicycles, and many other types of vehicles not explicitly described herein.

In some examples, the sensed road conditions may include variations in terrain, ambient light, or weather, such as fog, rain, or snow. In some examples, the sensed road conditions may further include vehicle position information, such as that obtained by a global positioning system (GPS) device. In some examples, the sensed road conditions may further include imagery or terrain information captured by optical, infrared, or ultrasound sensors, radar, or sonar. In some examples, the sensed road conditions may further include temperature, elevation, or other geographic data. In some examples, the sensed road conditions may further include the time of day, sunrise or sunset information, tidal information, or the phases of the moon. In further examples, the sensed road conditions may further include the terrain type, such as wooded, farmland, urban, rural, mountainous, flat, and the like.

In some examples, the system may perform numerous types of adjustments to the headlights in response to the sensed road conditions to increase the effectiveness of the headlights. For example, the system may adjust the direction, focal point, convergence point, intensity, color, shape, or pattern of the headlights to increase their effectiveness.

Although the techniques of this disclosure have been described mostly in the context of an adaptive vehicle illumination system, the techniques of this disclosure may be used in other settings or to achieve other types of lighting effects. For example, the techniques of this disclosure may be used in stationary lighting applications, such as streetlights, floodlights, porch lights, fog lights; in portable illumination systems, such as flashlights, lanterns, spotlights, In some examples, the image projected by the adaptive headlight system may comprise a logo of the manufacturer of the vehicle or a commercial sponsor. In other examples, the image may be a pattern chosen as an artistic design or for its ability to effectively illuminate the road. In some examples, the adaptive headlight system may allow the driver to select a projected pattern from a group of predefined shapes, such as a circle, square, star, triangle, snowflake, smiley face, or corporate logo. In some examples, the adaptive headlight system may allow the driver to upload an image to the system for projection and display. In some examples, the adaptive headlight system may allow the driver to select the color of the projected illumination. In some examples, the adaptive headlight system may operate in a "slideshow" mode and display each available image in a predetermined or random color for a predetermined period of time.

In some examples, the system may operate in different modes depending on the operating state of the vehicle. For example, while the vehicle is in a "parked," "neutral," or "showcase" mode of operation, it may operate to project a desired image of a desired color upon the surround terrain. While the vehicle is in a "drive" mode of operation, or when the vehicle senses that it is in motion, it may operate to project adaptive headlights to illuminate the roadway in accordance with the disclosure. In such a mode of operation, the vehicle may select a predetermined pattern and color to increase visibility in the manner described in this disclosure. Further, while the vehicle is in motion or in a "drive" mode of operation, it may select a predetermined pattern and color to comply with local, state, or federal regulations regarding vehicle illumination and disallow the driver from adjusting the pattern or color of the headlights of the vehicle.

In some examples, the adaptive vehicle headlight system may be used in a stationary illumination application, such as a floodlight or streetlight. In this example, the adaptive vehicle headlight system may operate to provide illumination to the surrounding area, and dynamically adjust its projected light to increase illumination based on sensed ambient conditions, such as any of the sensed conditions described above (e.g., weather, terrain, temperature, or ambient light conditions). In this example, such an adaptive headlight system may optimize the illumination provided to the surrounding area regardless of ambient weather or illumination conditions. Further, it may decrease installation time because it may dynamically adjust its illumination to compensate for the terrain around which it is installed, without manual input or configuration from the user installing the device. Additionally, an example device may decrease maintenance time by dynamically adjusting its illumination to account for new changes in the surrounding terrain.

FIG. 1 is a block diagram illustrating an example light projection system 100 in accordance with various examples of this disclosure. FIG. 1 depicts a pixelated light source 102, which projects light 103 to a plurality of digital micromirrors 104. The plurality of digital micromirrors 104 receives light 103 and reflects a portion of the light to a projection lens 106. The projection lens receives the reflected light and emits it for display.

In some examples, pixelated light source 102 may be a light-emitting diode (LED) array. Such an array may comprise a plurality of LEDs arranged in multiple rows and columns. Each LED may be connected to a substrate to allow individually control. In some examples, the brightness of each LED may be adjusted, while in other examples, the LED may be turned either on or off. In other examples, pixelated light source 102 may be a high-definition pixel engine (HDPE).

The use of pixelated light source 102 over a single light source allows the system to achieve much higher energy efficiency over conventional illumination systems. For example, if a single light source is used in a DLP system, the entire light source remains on at all times. For dark regions of the image, digital micromirrors redirected the light into an absorption material, wasting the energy used to create the absorbed light. In contrast, pixelated light source 102 may activate only the pixels of pixelated light source 102 that are needed to create the bright portions of the displayed image, and deactivate the pixels representing the dark portions of the displayed image. In this way, energy is not wasted on the dark sections of the image.

Further, the use of pixelated light source 102, over a single light source, may increase the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, pixelated light source 102 may deactivate pixels representing the dark portions of an image. This greatly reduces photon leakage, thus increasing the maximum blackness the system can display and improves contrast.

Furthermore, the pairing of the plurality of digital micromirrors 104 with the pixelated light source 102 may allow the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. By using the pixelated light source 102 to illuminate only the light portions of an image, and the plurality of digital micromirrors 104 to provide high resolution and granularity, the system may maintain the high efficiency and contrast of a pixelated light source and the high resolution of a DLP system. Furthermore, the ability of the DLP system to dynamically adjust each of the plurality of digital micromirrors 104 to redirect light away from the projection lens 106 further reduces photon leakage and improves the contrast achievable by either system used alone.

Figure 2A:
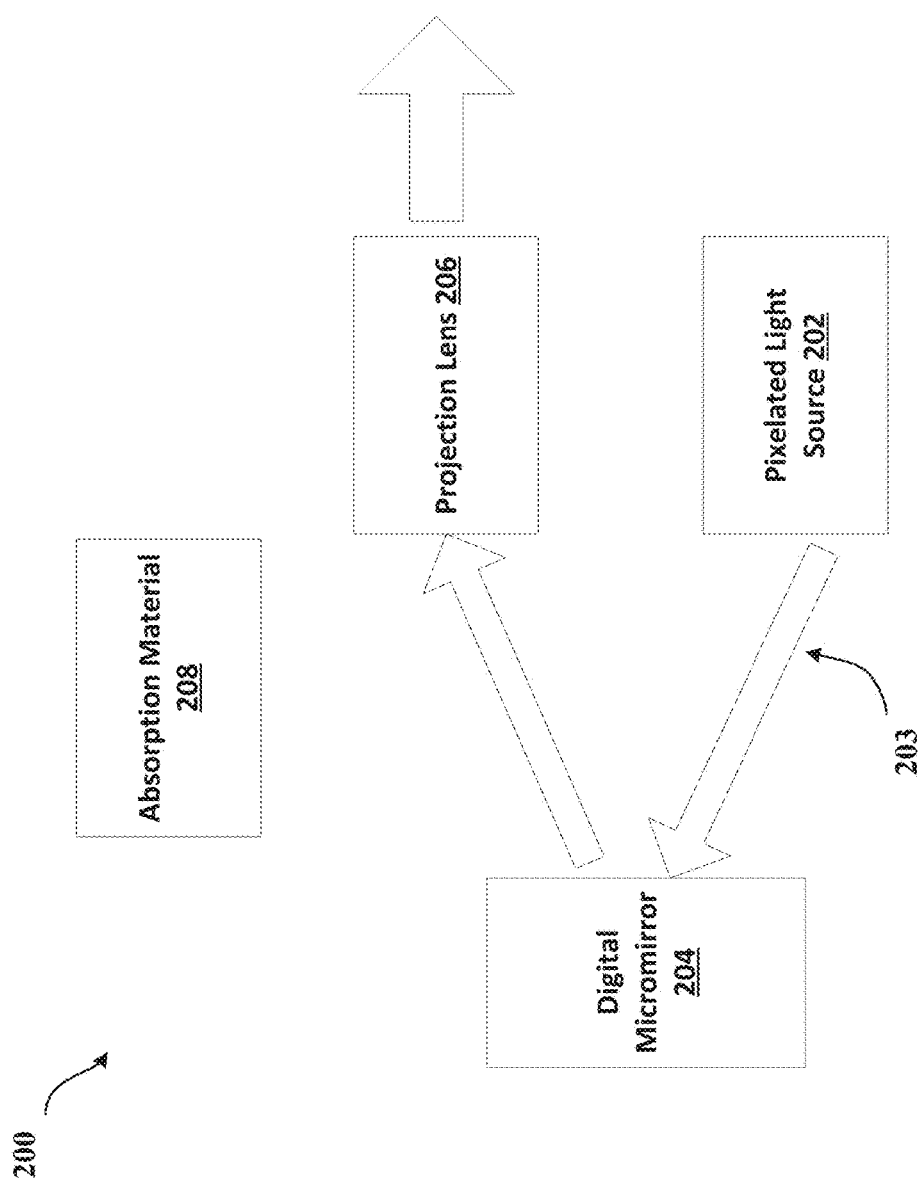
FIG. 2A is a block diagram illustrating an example configuration of a digital micromirror in an "on" state.
Figure 2B:
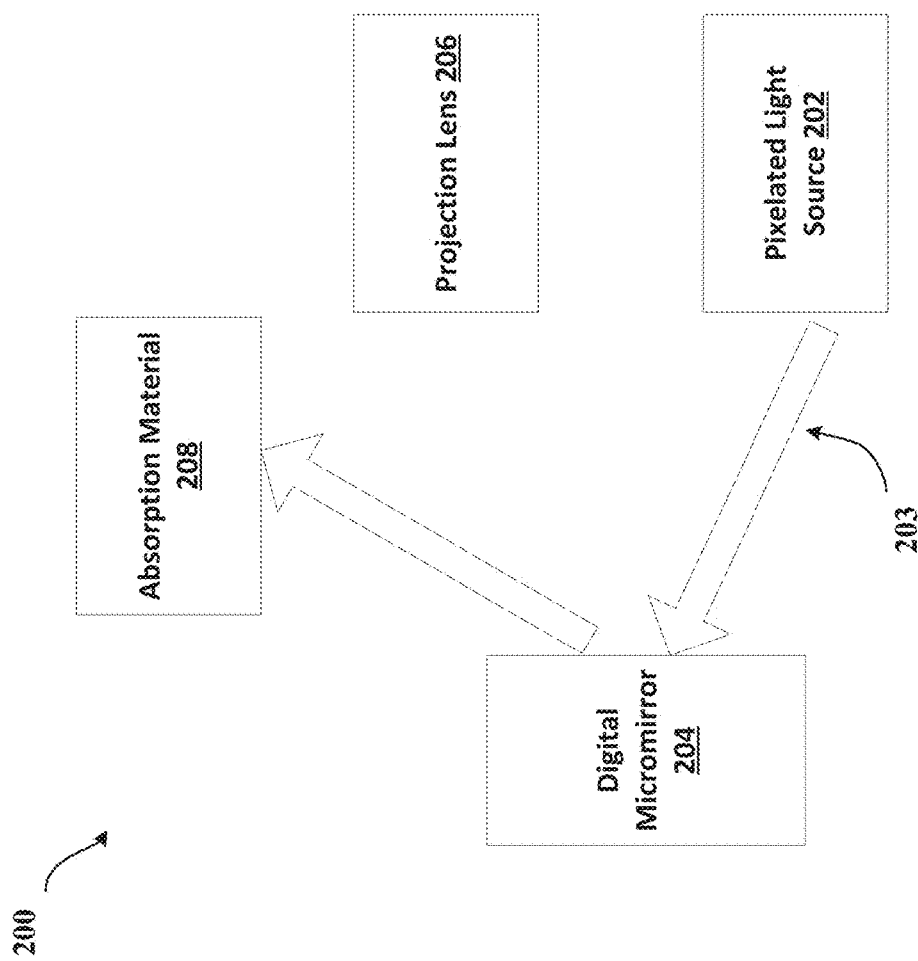
FIG. 2B is a block diagram illustrating an example configuration of a digital micromirror in an "off" state.

FIGS. 2A and 2B are block diagrams illustrating example configurations of a digital micromirror in an "on" and "off" state. In some examples, each digital micromirror of the plurality of digital micromirrors may be positioned in one of two states. With respect to FIG. 2A, in a first state, or "on" state, a digital micromirror 204 is positioned such that light 203 emitted from pixelated light source 202 is reflected to projection lens 206. With respect to FIG. 2B, in a second state, or "off" state, the digital micromirror 204 is positioned such that light 203 emitted from pixelated light source 202 is reflected into an absorption material 208.

In some examples, each digital micromirror of the plurality of digital micromirrors may be arranged in different states such that the light may be reflected to form a monochromatic image on the projection lens. In one example, a color wheel is interposed between the plurality of digital micromirrors and the projection lens to create a multicolored output. In another example, three pixelated light sources of different colors are used, wherein the light sources are selectively combined to create a multicolored output.

The use of the plurality of digital micromirrors 204 with the pixelated light source 202 allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. By using the pixelated light source 202 to illuminate only the light portions of an image, and the plurality of digital micromirrors 204 to provide high resolution and granularity, the system may maintain the high efficiency and contrast of a pixelated light source and the high resolution of a DLP system. Furthermore, the ability of the DLP system to dynamically adjust each of the plurality of digital micromirrors 204 to redirect light away from the projection lens 206 and to an absorption material 208 further reduces photon leakage and improves the contrast achievable by either system used alone.

Figure 3:
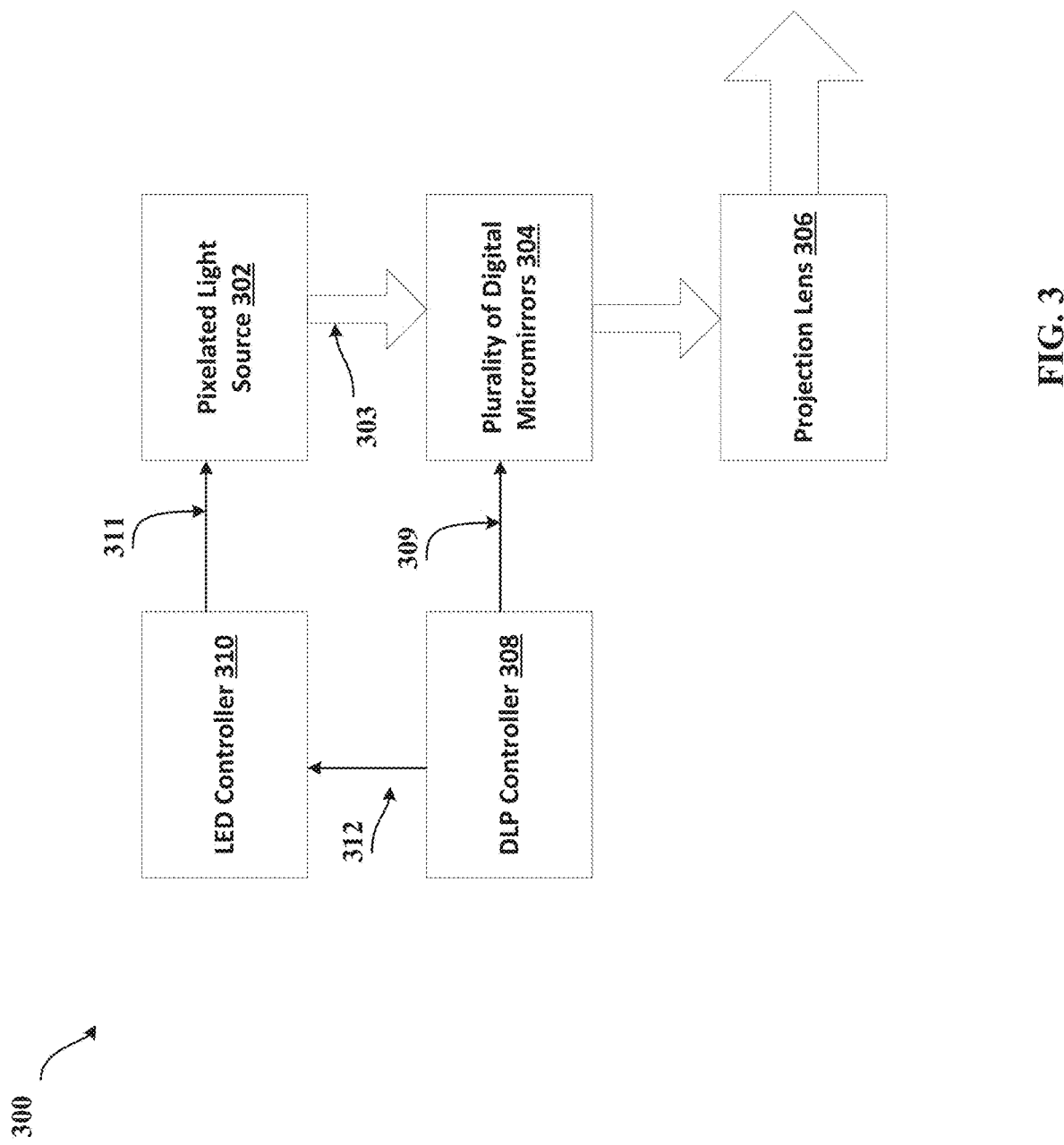
FIG. 3 is a block diagram illustrating an example control scheme in accordance with various examples of this disclosure.

FIG. 3 is a block diagram illustrating an example control scheme 300 in accordance with various examples of this disclosure. The pixelated light source, plurality of digital micromirrors, and projection lens operate as described above with respect to the example light projection system of FIG. 1. In this example, DLP controller 308 may use connection 309 to select a portion of the plurality of digital micromirrors 304 to operate in the "on" state and a portion to operate in the "off" state, the functions of which are described above with respect to FIGS. 2A and 2B. Additionally, DLP controller 308 may generate a bright zone map comprising a plurality of light zones and dark zones. DLP controller 308 may provide this map to the LED controller 310 along connection 312. LED controller 310 may use this map to selectively activate a portion of the LEDs of pixelated light source 302.

DLP controller 308 and LED controller 310 may include one or more processors, such as microprocessors, digital signal processors (DSPs), application specific integrated circuits (ASICs), field programmable gate arrays (FPGAs), or any other equivalent integrated or discrete logic circuitry, as well as any combinations of such components. Further, DLP controller 308 and LED controller 310 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof. Although DLP controller 308 and LED controller 310 are illustrated as separate components, in some examples, these controllers may be combined and implemented as a single controller that controls both pixelated light source 302 and the plurality of micromirrors 304. In some examples, controllers 308 and 310 may receive sensory feedback (e.g., sensed conditions of terrain) and may use such feedback to tune the light output.

The use of pixelated light source 302 over a single light source allows the system to achieve much higher energy efficiency over conventional illumination systems. For example, if a single light source is used in a DLP system, the entire light source remains on at all times. For dark regions of the image, digital micromirrors redirected the light into an absorption material, wasting the energy used to create the absorbed light. In contrast, the LED controller 310 may activate only the pixels of pixelated light source 302 that are needed to create the bright portions of the displayed image, and deactivate the pixels representing the dark portions of the displayed image. In this way, energy is not wasted on the dark sections of the image.

Further, the use of pixelated light source 302, over a single light source, increases the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, LED controller 310 may deactivate the pixels of pixelated light source 302 which represent the dark portions of an image. This greatly reduces photon leakage, thus of increasing the maximum blackness the system can display and improves contrast.

Furthermore, the pairing of the plurality of digital micromirrors 304 with the pixelated light source 302 allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. LED controller 310 may use a bright zone map supplied by DLP controller 308 to activate only the pixels of the pixelated light source 302 which illuminate the light portions of an image. By further using the plurality of digital micromirrors 304 to provide high resolution and granularity, the system may maintain the high efficiency and contrast of a pixelated light source and the high resolution of a DLP system. Furthermore, the DLP controller 308 may dynamically adjust each of the plurality of digital micromirrors 304 to redirect light away from the projection lens 306. This operation further reduces photon leakage and improves the contrast achievable over a system using only a pixelated light source or a DLP system.

Figure 4:
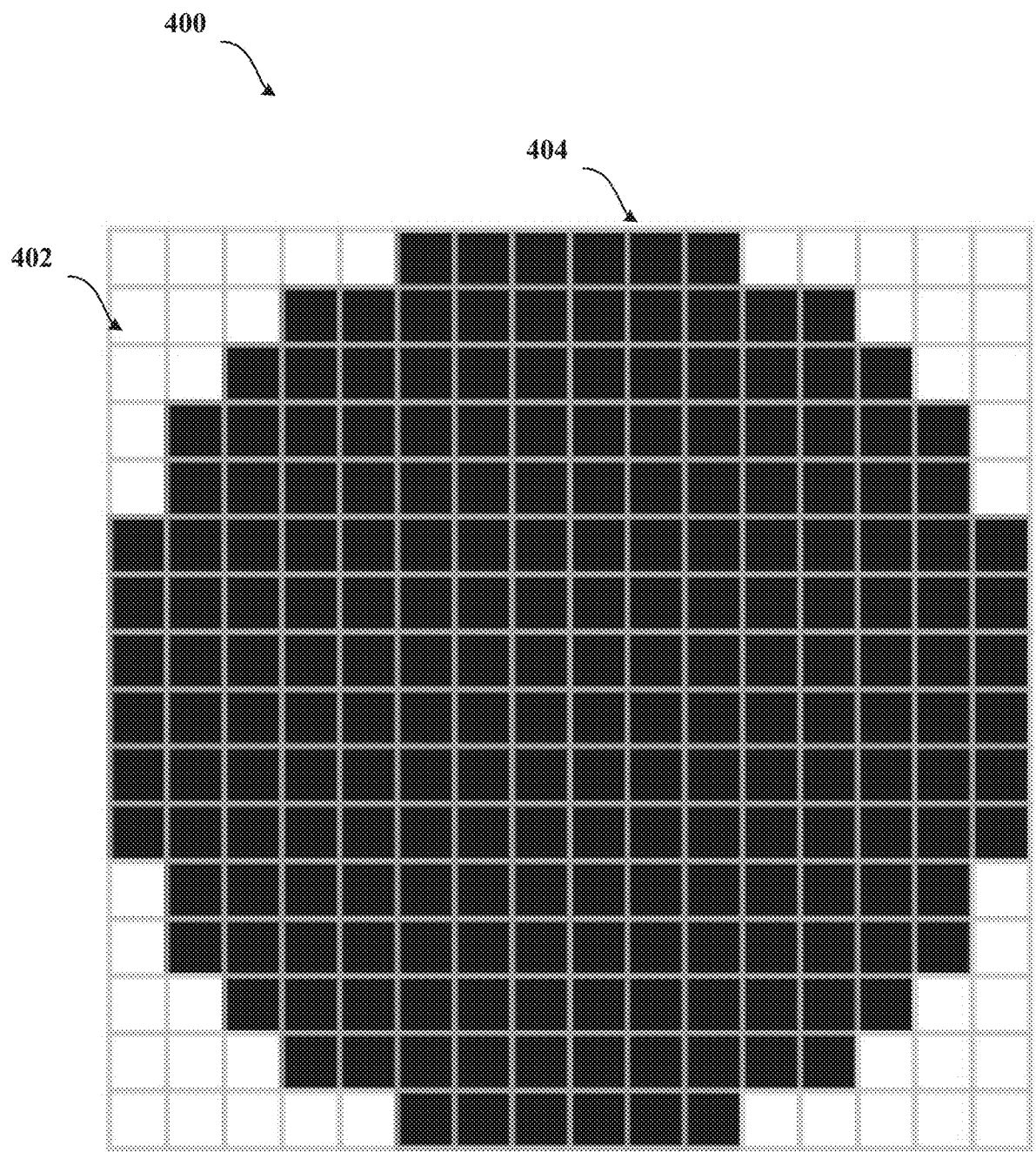
FIG. 4 is one example of a map having a plurality of light and dark zones in accordance with various examples of this disclosure.

FIG. 4 is one example of a bright zone map 400 in accordance with various examples of this disclosure. Bright zone map 400 may comprise a plurality of cells, each which may correspond to at least one pixel of pixelated light source 302. In some examples, each pixel may correspond to at least one LED of pixelated light source 302. In some examples, each cell may indicate a brightness of "0" (e.g. black) or "1" (e.g., white). In some examples, each cell may indicate a particular value in a contrast range between black and white. In some examples, a plurality of cells may indicate at least one bright zone 402. In some examples, a plurality of cells may indicate at least one dark zone 404. In some examples, LED controller 310 may use the bright zone map 400 to selectively activate at least one pixel of pixelated light source 302, and selectively deactivate at least one pixel of pixelated light source 302.

As described above, DLP controller 308 may provide many different types of bright zone maps to LED controller 310. In some examples, the bright zone map may represent the light and dark regions of basic geometric shapes (e.g., a circle, square, star, triangle, or the like). In other examples, the bright zone map may have a resolution high enough to represent the light and dark regions of more complex images (e.g., a snowflake, smiley face, corporate logo, or another image). In further examples, the bright zone map may be in black and white, in grayscale, or represent various colors. In some examples, the DLP may provide a bright zone map to the LED controller, which may preprocess the bright zone map so that it is suitable for the pixelated light source implanted in the system.

The use of the bright zone map provides a simple method of controlling the output of each pixel of pixelated light source 302. The structure of the bright zone map allows it to be easily manipulated, shared between LED controller 310 and DLP controller 308, and stored in the memory of each controller. The bright zone map allows LED controller 310 to activate only the pixels of pixelated light source 302 that are needed to create the bright portions of the displayed image, and deactivate the pixels representing the dark portions of the displayed image. In this way, the system may achieve much higher energy efficiency over conventional lighting systems because light is not wasted illuminating dark portions of the image. Additionally, because DLP controller 308 generates the bright zone map, it may synchronize the plurality of digital micromirrors 304 with the bright zone map. In this way, the plurality of digital micromirrors 304 may operate to further limit any photon leakage into the dark portions of the image, thereby increasing contrast over conventional lighting systems.

Figure 5:
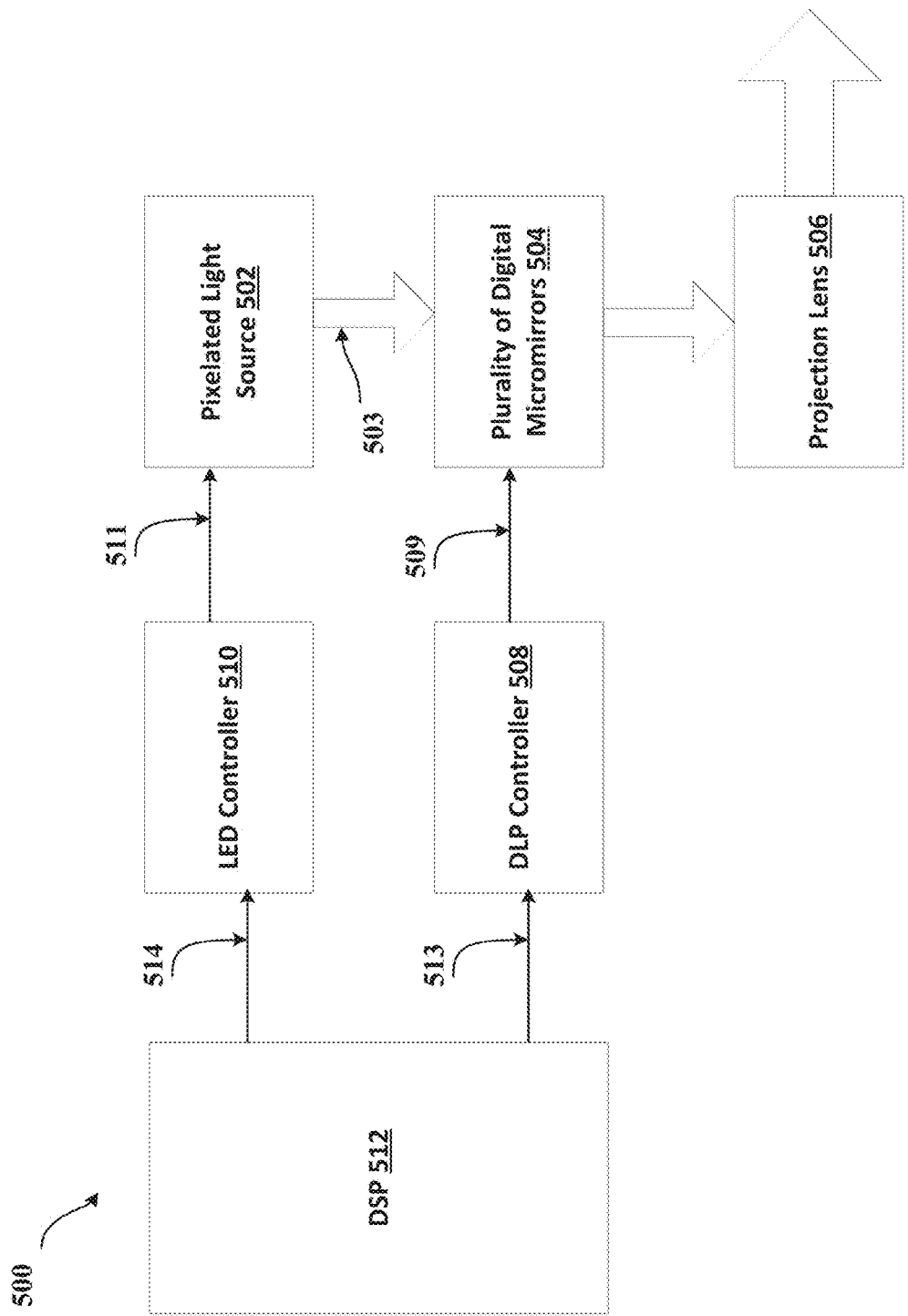
FIG. 5 is a block diagram illustrating an example control scheme in accordance with various examples of this disclosure.

FIG. 5 is a block diagram illustrating an example control scheme 500 in accordance with various examples of this disclosure. The pixelated light source, plurality of digital micromirrors, and projection lens operate as described above with respect to the example light projection system of FIG. 1. A DSP 512 may provide a DLP frame to DLP controller 508 along connection 514. DLP controller 508 may use the DSP frame to select a portion of the plurality of digital micromirrors 304 to operate in the "on" state and a portion to operate in the "off" state, the functions of which are described above with respect to FIGS. 2A and 2B. Additionally, DSP 512 may provide an LED frame to LED controller 510 along connection 513. LED controller 510 may use the LED frame to selectively activate a portion of the LEDs of pixelated light source 502.

DSP 512, DLP controller 508, and LED controller 510 may include one or more processors, such as microprocessors, digital signal processors (DSPs), application specific integrated circuits (ASICs), field programmable gate arrays (FPGAs), or any other equivalent integrated or discrete logic circuitry, as well as any combinations of such components. Further, DSP 512, DLP controller 508, and LED controller 510 may include memory, such as random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them. Further, this memory may be implanted entirely in hardware, software, or a combination thereof. In some examples, DLP controller 508 and LED controller 510 may be implemented as software operating on DSP 512 or another type of processor.

The use of pixelated light source 502 over a single light source allows the system to achieve much higher energy efficiency over conventional lighting systems. For example, if a single light source is used in a DLP system, the entire light source remains on at all times. For dark regions of the image, digital micromirrors redirected the light into an absorption material, wasting the energy used to create the absorbed light. In contrast, the LED controller 510 may activate only the pixels of pixelated light source 502 that are needed to create the bright portions of the displayed image, and deactivate the pixels representing the dark portions of the displayed image. In this way, energy is not wasted on the dark sections of the image.

Further, the use of pixelated light source 502, over a single light source, increases the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, LED controller 510 may deactivate the pixels of pixelated light source 502 which represent the dark portions of an image. This greatly reduces photon leakage, thus increasing the maximum blackness the system can display and improves contrast.

Furthermore, the pairing of the plurality of digital micromirrors 504 with the pixelated light source 502 allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. LED controller 510 may use an LED frame supplied by DSP 512 to activate only the pixels of the pixelated light source 502 which illuminate the light portions of an image. By further using the plurality of digital micromirrors 504 to provide high resolution and granularity, the system may maintain the high efficiency and contrast of a pixelated light source and the high resolution of a DLP system. Furthermore, the DLP controller 508 may dynamically adjust each of the plurality of digital micromirrors 504 based on a DLP frame received from DSP 512 to redirect light away from the projection lens 506. This operation further reduces photon leakage and improves the contrast achievable over a system using only a pixelated light source or a DLP system.

Figure 6:
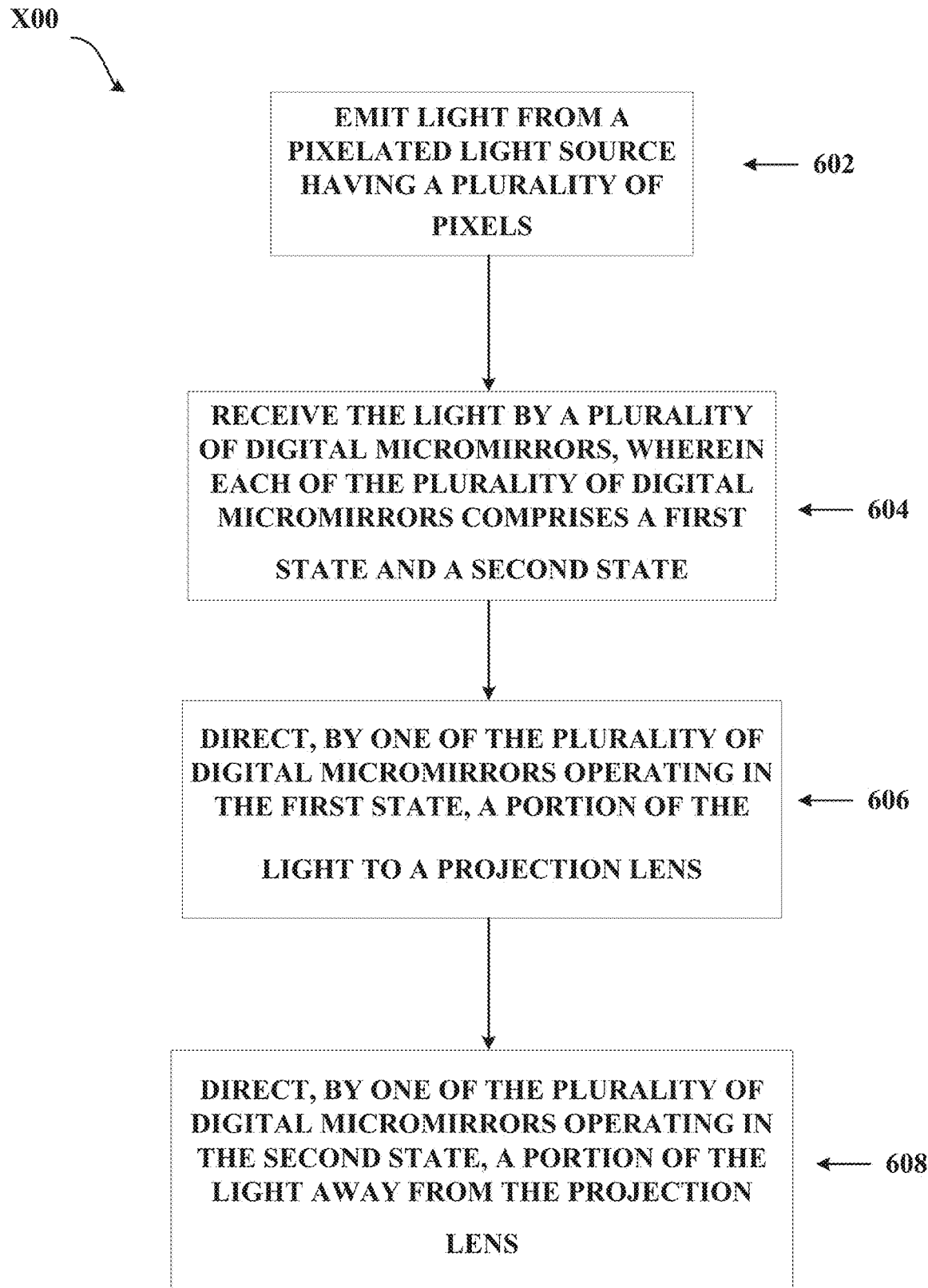
FIG. 6 is a block diagram illustrating an example technique for projecting light in accordance with various examples of this disclosure.

FIG. 6 is a block diagram illustrating an example technique for projecting light in accordance with various examples of this disclosure. FIG. 6 is described with respect to FIG. 1, but may also be applicable to FIGS. 3, 5, and 7. For example, pixelated light source 102 may emit light 103 (602). A plurality of digital micromirrors 104 may receive the light 103, wherein each of the plurality of digital micromirrors 104 comprises a first state and a second state (604). At least one of the plurality of digital micromirrors 104 operating in the first state may direct a portion of the light 103 to a projection lens 106 (606). At least one of the plurality of digital micromirrors 104 operating in the second state may direct a portion of the light 103 away from the projection lens 106 (608).

Further, the use of a pixelated light source, over a single light source, may increase the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, a pixelated light source may deactivate pixels representing the dark portions of an image. This greatly reduces photon leakage, thus increasing the maximum blackness the system can display and improves contrast.

Furthermore, the pairing of the plurality of digital micromirrors with the pixelated light source allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. By using the pixelated light source to illuminate only the light portions of an image, and the plurality of digital micromirrors to provide high resolution and granularity, the system may maintain the high efficiency and contrast of a pixelated light source and the high resolution of a DLP system. Furthermore, the ability of the DLP system to dynamically adjust each of the plurality of digital micromirrors to redirect light away from the projection lens further reduces photon leakage and improves the contrast achievable by either system used alone.

In some examples, DLP controller 308 may select the first state of at least one of the plurality of digital micromirrors 304. DLP controller 308 may further select the second state of at least one of the plurality of digital micromirrors 304. In this example, the DLP controller 308 may control the plurality of digital micromirrors to either reflect light from the pixelated light source to a projection lens, or reflect the light into an absorption material. By combining the pixelated light source with the plurality of digital micromirrors, the system may maintain the high efficiency and contrast of a pixelated light source and the high resolution of a DLP system. Furthermore, the ability of the DLP system to dynamically adjust each of the plurality of digital micromirrors to redirect light away from the projection lens further reduces photon leakage and improves the contrast achievable by either system used alone.

In some examples, DLP controller 308 may generate a map comprising a plurality of bright zones and a plurality of dark zones. In other examples, DLP controller 308 may generate the map based on sensor data obtained from a plurality of sensors which monitor road conditions encountered by a vehicle. The use of the bright zone map provides a simple method of controlling the output of each pixel of pixelated light source 302. The structure of the bright zone map allows it to be easily manipulated, shared between LED controller 310 and DLP controller 308, and stored in the memory of each controller. Because DLP controller 308 generates the bright zone map, it may synchronize the plurality of digital micromirrors 304 with the bright zone map. In this way, the plurality of digital micromirrors 304 may operate to further limit any photon leakage into the dark portions of the image, thereby increasing contrast relative to conventional lighting systems.

In some examples, LED controller 310 may receive the map. In further examples, LED controller 310 may activate each of the plurality of pixels corresponding to each of the plurality of bright zones of the map; and deactivate each of the plurality of pixels corresponding to each of the plurality of dark zones of the map. The bright zone map allows LED controller 310 to activate only the pixels of pixelated light source 302 that are needed to create the bright portions of the displayed image, and deactivate the pixels representing the dark portions of the displayed image. In this way, the system may achieve much higher energy efficiency than conventional lighting systems because light is not wasted illuminating dark portions of the image. In some examples, the displayed image is a design chosen by the system for artistic or informational purposes. In other examples, the displayed image may be a pattern projected by a vehicle headlight that is optimized to account for road conditions, such as terrain, weather, and the like.

In some examples, DSP 512 may provide a digital light processing frame to DLP controller 508, and provide a light-emitting diode frame to LED controller 510. In some examples, DLP controller 508 may select the first state of at least one of the plurality of digital micromirrors based on the DLP frame, and select the second state of at least one of the plurality of digital micromirrors based on the DLP frame. LED controller 510 may selectively activate the plurality of pixels based on the light-emitting diode frame. In other words, LED controller 510 may use the LED frame supplied by DSP 512 to activate only the pixels of the pixelated light source 502 which illuminate the light portions of an image. Furthermore, the DLP controller 508 may dynamically adjust each of the plurality of digital micromirrors 504 based on a DLP frame received from DSP 512 to redirect light away from the projection lens 506. This operation further reduces photon leakage and improves the contrast achievable over a system using only a pixelated light source or a DLP system. By using the pixelated light source as an efficient light source and the plurality of digital micromirrors 504 to provide high resolution and granularity to the projection system, the system may maintain the high efficiency and contrast of a pixelated light source and the high resolution of a DLP system.

Figure 7:
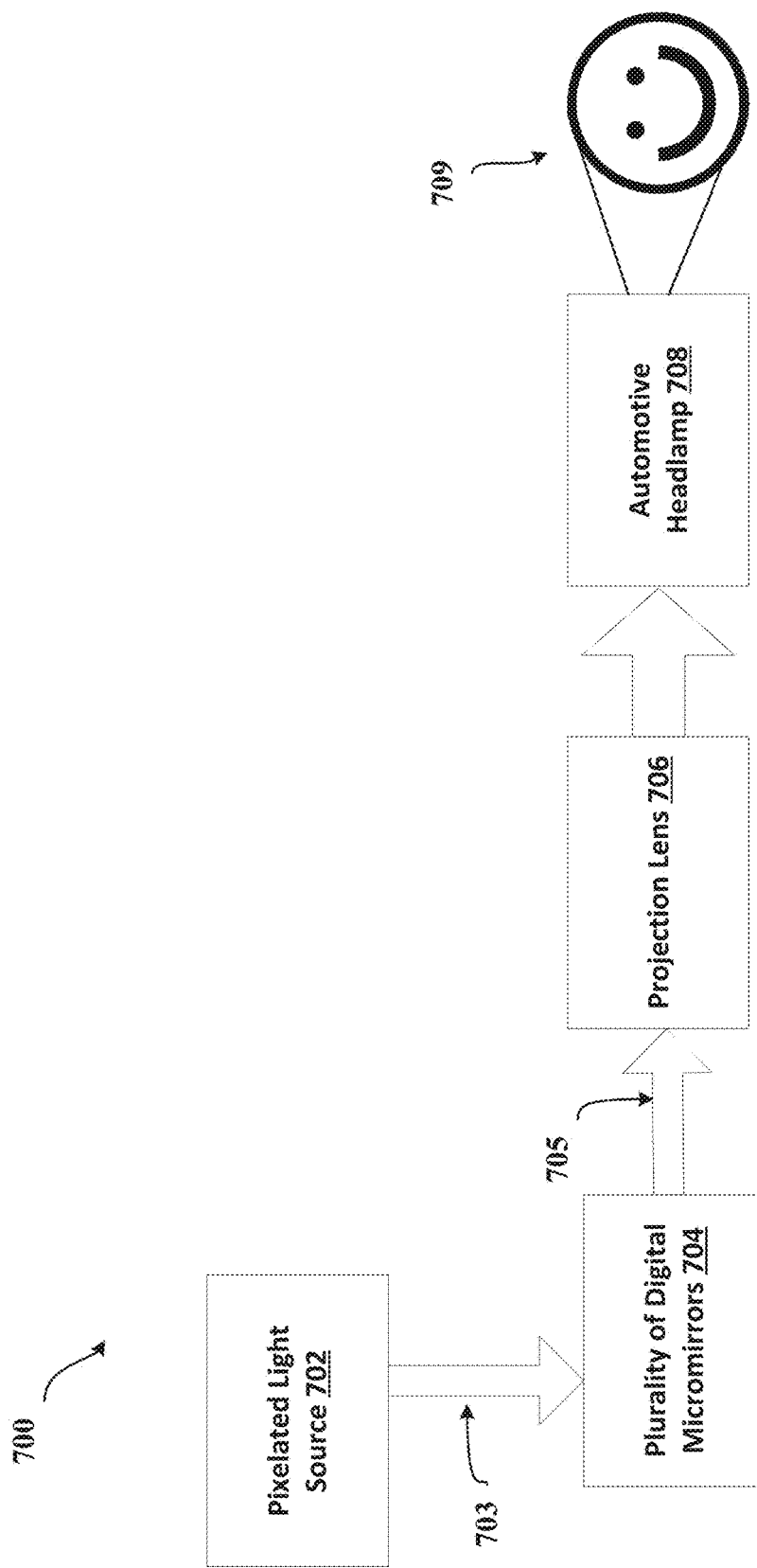
FIG. 7 is a block diagram illustrating an example automotive light projection system in accordance with various examples of this disclosure.

FIG. 7 is a block diagram illustrating an example automotive light projection system in accordance with various examples of this disclosure. FIG. 7 depicts a pixelated light source 702, which projects light 703 to a plurality of digital micromirrors 704. The plurality of digital micromirrors 704 receives light 703 and reflects a portion of the light 705 to a projection lens 706. The projection lens receives the reflected light and projects it to automotive headlamp 708. Automotive headlamp 704 emits the light for illumination. In some examples, the "on" and "off" states of the plurality of digital micromirrors 704 may be arranged such that the reflected portion of the light 705 forms an image. This image may be projected through projection lens 706 to automotive headlamp 708, where it may be emitted for display as an image 709. In some examples, image 709 is a design chosen by the system for artistic or informational purposes. In other examples, image 709 may be a pattern projected by a vehicle headlight that is optimized to account for road conditions, such as terrain, weather, and the like.

Such an example automotive light projection system may be used to implement an adaptive vehicle headlamp system which provides vehicle headlights that have having higher resolution, higher contrast, and improved energy efficiency over conventional lighting systems. Such a system may be used to dynamically adjust the projection of a vehicle's headlights in response to sensed road conditions. In some examples, the system may continuously measure road conditions, and then adjust the illumination of the headlights improve the effectiveness of the headlights. In some examples, such an adjustment may improve visibility of the roadway or surrounding terrain. In other examples, such an adjustment may reduce the glare to the driver (e.g., adjusting the headlights to reduce light reflected back at the driver by rain, snow, fog, or other weather conditions). Further, such an adaptive vehicle headlight system may allow the vehicle headlights to project an image onto the roadway.

The use of pixelated light source 702 over a single light source allows the system to achieve much higher energy efficiency than conventional lighting systems. For example, if a single light source is used in a DLP system, the entire light source remains on at all times. For dark regions of the image, digital micromirrors redirected the light into an absorption material, wasting the energy used to create the absorbed light. In contrast, pixelated light source 702 may activate only the pixels of pixelated light source 702 that are needed to create the bright portions of the displayed image, and deactivate the pixels representing the dark portions of the displayed image. In this way, energy is not wasted on the dark sections of the image. Thus, an adaptive vehicle headlight system making use of the techniques disclosed within would operate much more efficiently than conventional vehicle headlight systems.

Further, the use of pixelated light source 702, over a single light source, increases the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, pixelated light source 702 may deactivate pixels representing the dark portions of an image. This greatly reduces photon leakage, thus increasing the maximum blackness the system can display and improves contrast. Thus, an adaptive vehicle headlight system making use of the techniques disclosed within would possess much greater contrast than conventional vehicle headlight systems.

Furthermore, the pairing of the plurality of digital micromirrors 704 with the pixelated light source 702 allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. By using the pixelated light source 702 to illuminate only the light portions of an image, and the plurality of digital micromirrors 104 to provide high resolution and granularity, the system may maintain the high efficiency and contrast of a pixelated light source and the high resolution of a DLP system. Furthermore, the ability of the DLP system to dynamically adjust each of the plurality of digital micromirrors 704 to redirect light away from the projection lens 106 further reduces photon leakage and improves the contrast achievable by either system used alone. Thus, an adaptive vehicle headlight system making use of the techniques disclosed within would possess both greater efficiency and resolution than conventional vehicle headlight systems.

Figure 8:
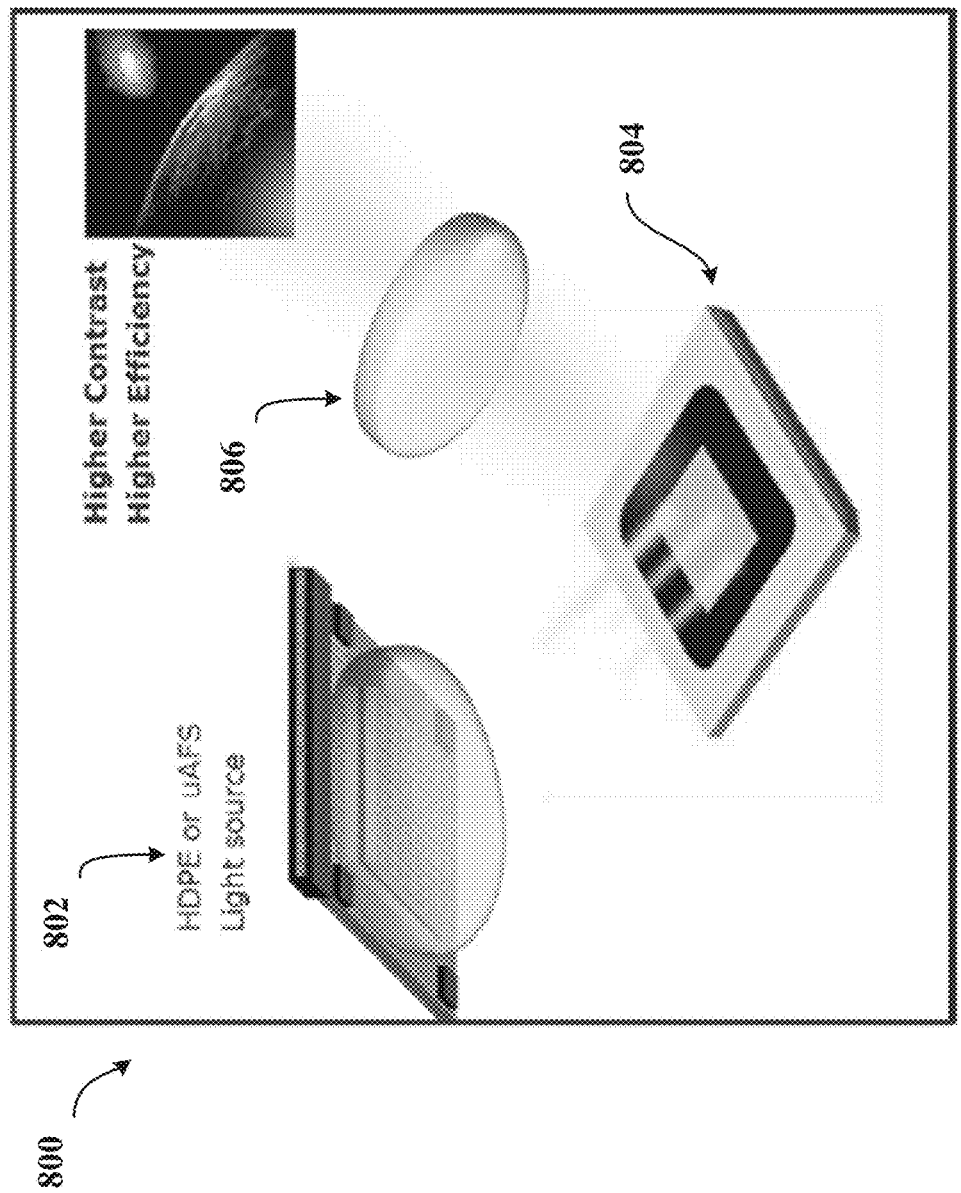
FIG. 8 is a block diagram illustrating an example light projection system in accordance with various examples of this disclosure.

FIG. 8 is a block diagram illustrating an example light projection system 800 in accordance with various examples of this disclosure. A pixelated light source 802, which may be a HDPE light source, may emit light which is received by a plurality of digital micromirrors 804. The plurality of digital micromirrors may redirect a portion of the received light to a projection lens 806.

The use of pixelated light source 802 over a single light source allows the system to achieve much higher energy efficiency than conventional lighting systems. For example, if a single light source is used in a DLP system, the entire light source remains on at all times. For dark regions of the image, digital micromirrors redirected the light into an absorption material, wasting the energy used to create the absorbed light. In contrast, pixelated light source 802 may activate only the pixels of pixelated light source 802 that are needed to create the bright portions of the displayed image, and deactivate the pixels representing the dark portions of the displayed image. In this way, energy is not wasted on the dark sections of the image.

Further, the use of pixelated light source 802, over a single light source, increases the contrast of the image. As described above, with the use of a single light source, digital micromirrors may redirect light into an absorption material to create the dark portions of an image. However, some amount of photons still reaches the projection lens. This photon leakage creates some amount of illumination, limiting the maximum blackness that the projection system can create. In contrast, pixelated light source 802 may deactivate pixels representing the dark portions of an image. This greatly reduces photon leakage, thus increasing the maximum blackness the system can display and improves contrast.

Furthermore, the pairing of the plurality of digital micromirrors 804 with the pixelated light source 802 allows the system to provide the superior resolution offered by a DLP system, while still maintaining the high efficiency and contrast of a pixelated light source. Because pixelated light sources typically can achieve only thousands of pixels, they are unsuitable for modern display operations (e.g., computer applications and high-definition television) which require millions of pixels to operate. In contrast, a DLP system may provide millions of pixels of resolution, but suffers from efficiency and contrast problems. By using the pixelated light source 802 to illuminate only the light portions of an image, and the plurality of digital micromirrors 804 to provide high resolution and granularity, the system may maintain the high efficiency and contrast of a pixelated light source and the high resolution of a DLP system. Furthermore, the ability of the DLP system to dynamically adjust each of the plurality of digital micromirrors 804 to redirect light away from the projection lens 806 further reduces photon leakage and improves the contrast achievable by either system used alone.

Figure 9:
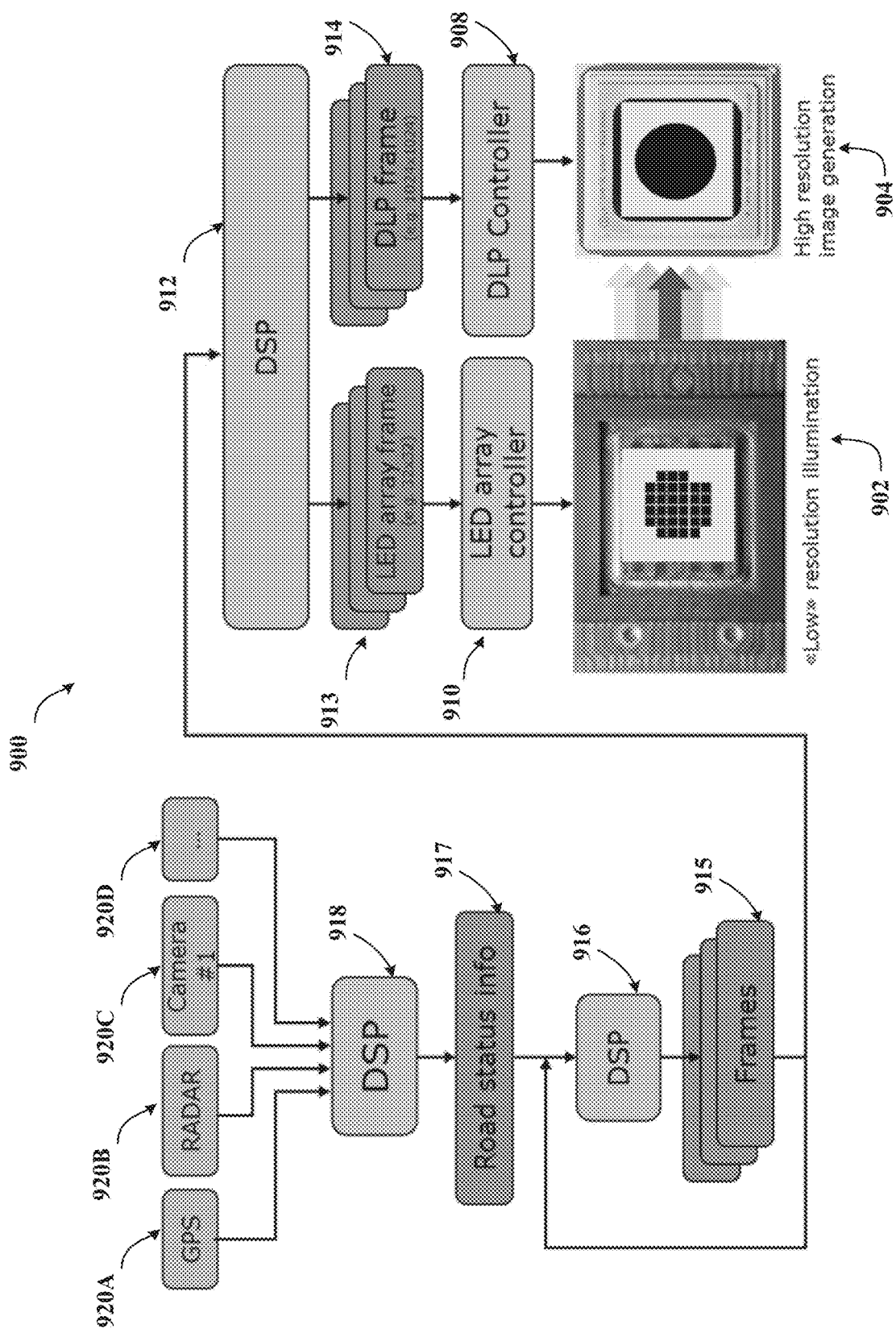
FIG. 9 is a block diagram illustrating an example automotive light projection system in accordance with various examples of this disclosure.

FIG. 9 is a block diagram illustrating an example automotive light projection system 900 in accordance with various examples of this disclosure. A plurality of sensors 920 may periodically gather road information data. Such sensors may include, for example, a GPS sensor 920A, a radar transceiver 920B, a camera 920C, or other sensors capable of gathering road information data. The road information data is fed into DSP 918, which aggregates the road information data into road status information 917. DSP 916 receives the road status information 917 and creates a reference frame 915. DSP 916 operates in a feedback loop, where it may compare a previous reference frame with the road status information 917 to generate a new reference frame. DSP 912 receives the reference frame 917 and uses the information contained within to create an LED array frame 913 and a DLP frame 914. As discussed above, LED array controller 910 may receive LED array frame 913 from DSP 912. In some examples, the LED array frame 913 may be a map comprising a plurality of light zones and dark zones. LED array controller 910 may use the LED array frame 913 to selectively activate or deactivate least one pixel of pixelated light source 902. Further, DLP controller 908 may receive DLP frame 914 from DSP 912. DLP Controller 908 may use DLP frame 914 to select a portion of the plurality of digital micromirrors 904 to operate in the "on" state and a portion to operate in the "off" state. In some examples, the DLP frame 914 may be a map comprising a plurality of light zones and dark zones. The plurality of digital micromirrors 904 may receive light emitted by pixelated light source 902 and selectively redirect it to a projection lens (not depicted) and automotive headlamp (not depicted), where it may be output for display.

Such an adaptive automotive light projection system may make use of the described light projection system to provide vehicle headlights having higher resolution, higher contrast, and improved energy efficiency relative to conventional lighting systems. Further, such a system may be used to dynamically adjust the projection of a vehicle's headlights in response to sensed road conditions. In some examples, the system may continuously measure road conditions, and then adjust the illumination of the headlights improve the effectiveness of the headlights. In some examples, such an adjustment may improve visibility of the roadway or surrounding terrain. In other examples, such an adjustment may reduce the glare to the driver (e.g., adjusting the headlights to reduce light reflected back at the driver by rain, snow, fog, or other weather conditions). Further, such an adaptive vehicle headlight system may allow the vehicle headlights to project an image onto the roadway. Thus, the system increases the visibility of the roadway and surrounding area to the driver. This has the additional benefit of increasing safety to the driver, passengers, bystanders, and other vehicles nearby.

The adaptive vehicle headlight system set forth in this disclosure may be suitable for any type of vehicle, for example, automobiles, such as cars, trucks, and sport utility vehicles (SUV), watercraft and ships, aircraft, military vehicles, such as tanks, jeeps, and half-tracks, amphibious vehicles, transportation vehicles, such as semi-trucks and trailers, construction vehicles, such as bulldozers, tractors, backhoes, and cranes, heavy machinery, trains, motorcycles, recreational vehicles such as golf carts, dune buggies, and all-terrain vehicles (ATV), unpowered vehicles, such as bicycles, and many other types of vehicles not explicitly described herein.

In some examples, the sensed road conditions may include variations in terrain, ambient light, or weather, such as fog, rain, or snow. In some examples, the sensed road conditions may further include vehicle position information, such as that obtained by a global positioning system (GPS) device. In some examples, the sensed road conditions may further include imagery or terrain information captured by optical, infrared, or ultrasound sensors, radar, or sonar. In some examples, the sensed road conditions may further include temperature, elevation, or other geographic data. In some examples, the sensed road conditions may further include the time of day, sunrise or sunset information, tidal information, or the phases of the moon. In further examples, the sensed road conditions may further include the terrain type, such as wooded, farmland, urban, rural, mountainous, flat, and the like.

In some examples, the system may perform numerous types of adjustments to the headlights in response to the sensed road conditions to increase the effectiveness of the headlights. For example, the system may adjust the direction, focal point, convergence point, intensity, color, shape, or pattern of the headlights to increase their effectiveness.

Thus, example techniques for an adaptive automotive light projection system are described. In the example of FIG. 9, the system is capable of continuously monitoring various road conditions and dynamically adjusting the automotive headlamps to compensate for the detected road conditions. In some examples, such road conditions may take into account terrain or weather conditions, such as fog, rain, or snow. The system may make adjustments to the beam emitted by the headlamps, such as changing the intensity, direction, or shape of the beam to compensate for the detected weather conditions. In some examples, the adjustments may be performed to minimize glare reflected to the driver or to increase the driver's visibility.

Thus, the disclosed adaptive automotive light projection system may provide numerous benefits over conventional vehicle headlights. As one example, the system makes use of a first DSP to sense road conditions and dynamically adjust the headlights of the vehicle to respond to the sensed road conditions. In other words, the system may actively modify various characteristics of the light projected by the headlights to enhance various qualities of the headlights when poor terrain or weather is encountered. Thus, the system may provide improved visibility to the driver over conventional vehicle headlights. As another example, the system makes use of a pixelated light source and an LED controller operating in conjunction with a DLP controller and plurality of digital micromirrors. In this fashion, the system may provide higher resolution, contrast, and efficiency than vehicle headlight systems using solely a pixelated light source or a DLP.

The following examples may illustrate one or more aspects of the disclosure.

Example 1

A system comprising: a pixelated light source that includes a plurality of pixels; a plurality of digital micromirrors configured to receive input light from the pixelated light source and configured to modify the input light to generate output light; and one or more controllers configured to control both the pixelated light source and the plurality of digital micromirrors to condition the output light.

Example 2

The system of example 1, wherein the pixelated light source comprises one of a light-emitting diode array and a high-definition pixel engine.

Example 3

The system of any combination of examples 1-2, further comprising a projection lens configured to receive the output light from the plurality of digital micromirrors.

Example 4

The system of any combination of examples 1-3, wherein each digital micromirror of the plurality of digital micromirrors comprises: a first state, wherein each of the plurality of digital micromirrors is arranged to direct the output light to the projection lens; and a second state, wherein each of the plurality of digital micromirrors is arranged to direct the output light away from the projection lens.

Example 5

The system of any combination of examples 1-4, wherein the one or more controllers are configured to generate a map comprising a plurality of bright zones and a plurality of dark zones.

Example 6

The system of any combination of examples 1-5, wherein the one or more controllers are further configured to: activate each of the plurality of pixels corresponding to each of the plurality of bright zones of the map; and deactivate each of the plurality of pixels corresponding to each of the plurality of dark zones of the map.

Example 7

The system of any combination of examples 1-6, wherein the one or more controllers comprises: one or more digital light processing controllers configured to control the plurality of digital micromirrors; one or more light-emitting diode controllers configured to control the pixelated light source; and one or more digital signal processors, configured to: provide a digital light processing frame to the one or more digital light processing controllers; and provide a light-emitting diode frame to the one or more light-emitting diode controllers.

Example 8

The system of any combination of examples 1-7, wherein the one or more digital light processing controllers are configured to control the plurality of digital micromirrors based on the digital light processing frame; and wherein the one or more light-emitting diode controllers are configured to selectively activate the plurality of pixels based on the light-emitting diode frame.

Example 9

A method comprising: emitting light from a pixelated light source that includes a plurality of pixels; receiving the light by a plurality of digital micromirrors, wherein each of the plurality of digital micromirrors comprises a first state and a second state; directing, by one of the plurality of digital micromirrors operating in the first state, a portion of the light to a projection lens; and directing, by one of the plurality of digital micromirrors operating in the second state, a portion of the light away from the projection lens.

Example 10

The method of example 9, wherein the pixelated light source comprises one of a light-emitting diode array and a high-definition pixel engine.

Example 11

The method of any combination of examples 9-10, further comprising controlling both the pixelated light source and the plurality of digital micromirrors to condition the output light.

Example 12

The method of any combination of examples 9-11, further comprising: selecting, by one or more digital light processing controllers, the first state of at least one of the plurality of digital micromirrors; and selecting, by one or more digital light processing controllers, the second state of at least one of the plurality of digital micromirrors.

Example 13

The method of any combination of examples 9-12, further comprising generating, by the one or more digital light processing controllers, a map comprising a plurality of bright zones and a plurality of dark zones.

Example 14

The method of any combination of examples 9-13, further comprising receiving, by one or more light-emitting diode controllers, the map.

Example 15

The method of any combination of examples 9-14, further comprising: activating, by the one or more light-emitting diode controllers, each of the plurality of pixels corresponding to each of the plurality of bright zones of the map; and deactivating, by the one or more light-emitting diode controllers, each of the plurality of pixels corresponding to each of the plurality of dark zones of the map.

Example 16

The method of any combination of examples 9-15, further comprising: providing, by one or more digital signal processors, a digital light processing frame to one or more digital light processing controllers; and providing, by one or more digital signal processors, a light-emitting diode frame to one or more light-emitting diode controllers.

Example 17

The method of any combination of examples 9-16, further comprising: selecting, by one or more digital light processing controllers, the first state of at least one of the plurality of digital micromirrors based on the digital light processing frame; selecting, by one or more digital light processing controllers, the second state of at least one of the plurality of digital micromirrors based on the digital light processing frame; selectively activating, by the one or more light-emitting diode controllers, the plurality of pixels based on the light-emitting diode frame.

Example 18

The system of any combination of examples 1-8, further comprising a projection lens, and wherein the pixelated light source, the plurality of digital micromirrors, and the projection lens form a vehicle headlamp.

Example 19

The system of any combination of examples 1-8 and 18, wherein the pixelated light source comprises one of a light-emitting diode array and a high-definition pixel engine.

Example 20

The system of any combination of examples 1-8 and 19, wherein the state of each of the plurality of digital micromirrors is configured so as to direct the light to the projection lens in the form of an image.

Example 21

The system of any combination of examples 1-8 and 19, wherein the portion of the light received by the projection lens is conditioned to reduce glare to a driver.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

The invention claimed is:

1. An illumination system for a vehicle comprising:
   a pixelated light source that includes a plurality of pixels;
   a plurality of digital micromirrors configured to receive input light from the pixelated light source and configured to modify the input light to generate output light; and
   one or more digital signal processors, configured to:
   determine an operating mode of a plurality of operating modes of the vehicle, wherein the plurality of operating modes of the vehicle include a drive operating mode of the vehicle and a stationary operating mode of the vehicle;
   receive road information data from one or more sensors;
   generate, based on the operating mode of the vehicle and the road information data, a digital light processing frame and a light-emitting diode frame;
   provide the digital light processing frame to one or more digital light processing controllers to control the plurality of digital micromirrors; and
   provide a light-emitting diode frame to the one or more light-emitting diode controllers to control the pixelated light source.

2. The system of claim 1, further comprising a projection lens configured to receive the output light from the plurality of digital micromirrors.

3. The system of claim 2, wherein each digital micromirror of the plurality of digital micromirrors comprises:
   a first state, wherein each of the plurality of digital micromirrors is arranged to direct the output light to the projection lens; and
   a second state, wherein each of the plurality of digital micromirrors is arranged to direct the output light away from the projection lens.

4. The system of claim 1,
   wherein the light-emitting diode frame comprises a map comprising a plurality of bright zones and a plurality of dark zones, and
   wherein the one or more light-emitting diode controllers are further configured to:
   activate each of the plurality of pixels corresponding to each of the plurality of bright zones of the map; and
   deactivate each of the plurality of pixels corresponding to each of the plurality of dark zones of the map.

5. The system of claim 1, further comprising a projection lens, and wherein the pixelated light source, the plurality of digital micromirrors, and the projection lens form a vehicle headlamp.

6. The system of claim 5, wherein the pixelated light source comprises one of an light-emitting diode array and a high-definition pixel engine.

7. The system of claim 5, wherein the state of each of the plurality of digital micromirrors is configured so as to direct the light to the projection lens in the form of an image.

8. The system of claim 7, wherein the portion of the light received by the projection lens is conditioned to reduce glare to a driver.

9. The system of claim 1, wherein the one or more sensors comprise one or more of:
   a GPS sensor;
   a radar transceiver; or
   a camera.

10. The system of claim 1, wherein at least one of the digital light processing frame and the light-emitting diode frame are configured to change, based on the road information data, at least one of:
    an intensity of the output light;
    a color of the output light;
    a shape of the output light; or
    a pattern of the output light.

11. The system of claim 1, wherein the road information data comprises at least one of:
    weather data;
    terrain data;
    geographic data;
    ambient light data; or
    vehicle position information.

12. A method comprising:
    determining, by one or more digital signal processors of a vehicle, an operating mode of a plurality of operating modes of the vehicle, wherein the plurality of operating modes of the vehicle include a drive operating mode of the vehicle and a stationary operating mode of the vehicle;
    receiving, by the one or more digital signal processors, road information data from one or more sensors;
    generating, by the one or more digital signal processors and based on the operating mode of the vehicle and the road information data, a digital light processing frame and a light-emitting diode frame;
    emitting, based on the light-emitting diode frame, light from a pixelated light source that includes a plurality of pixels;
    receiving the light by a plurality of digital micromirrors, wherein each of the plurality of digital micromirrors comprises a first state and a second state;
    directing, by one of the plurality of digital micromirrors operating in the first state and based on the digital light processing frame, a portion of the light to a projection lens; and
    directing, by one of the plurality of digital micromirrors operating in the second state and based on the digital light processing frame, a portion of the light away from the projection lens.

13. The method of claim 12, further comprising controlling both the pixelated light source and the plurality of digital micromirrors to condition the output light.

14. The method of claim 12, further comprising:
    selecting, by one or more digital light processing controllers and based on the digital light processing frame, the first state of at least one of the plurality of digital micromirrors; and
    selecting, by the one or more digital light processing controllers and based on the digital light processing frame, the second state of at least one of the plurality of digital micromirrors.

15. The method of claim 14,
    wherein the light-emitting diode frame comprises a map comprising a plurality of bright zones and a plurality of dark zones, and
    wherein the method further comprises receiving, by one or more light-emitting diode controllers, the map.

16. The method of claim 15, further comprising:
    activating, by the one or more light-emitting diode controllers, each of the plurality of pixels corresponding to each of the plurality of bright zones of the map; and
    deactivating, by the one or more light-emitting diode controllers, each of the plurality of pixels corresponding to each of the plurality of dark zones of the map.

17. The method of claim 12, further comprising:
    selecting, by one or more digital light processing controllers, the first state of at least one of the plurality of digital micromirrors based on the digital light processing frame;
    selecting, by the one or more digital light processing controllers, the second state of at least one of the plurality of digital micromirrors based on the digital light processing frame;
    selectively activating, by one or more light-emitting diode controllers, the plurality of pixels based on the light-emitting diode frame.

18. A method comprising:
    determining, by one or more digital signal processors of a vehicle, an operating mode of a plurality of operating modes of the vehicle, wherein the plurality of operating modes of the vehicle include a drive operating mode of the vehicle and a stationary operating mode of the vehicle;
    receiving, by the one or more digital signal processors, road information data from one or more sensors;
    generating, by the one or more digital signal processors and based on the operating mode of the vehicle and the road information data, a digital light processing frame and a light-emitting diode frame;
    providing, by the one or more digital signal processors, the light-emitting diode frame to one or more light-emitting diode controllers to control a pixelated light source that includes a plurality of pixels;
    providing, by the one or more digital signal processors, the digital light processing frame to one or more digital light processing controllers to control a plurality of digital micromirrors,
    wherein the plurality of digital micromirrors are configured to receive input light from the pixelated light source and further configured to modify the input light to generate output light.

19. The method of claim 18,
    wherein determining the operating mode of the vehicle comprises determining that the vehicle is in the drive operating mode, and
    wherein generating, based on the operating mode of the vehicle and the road information data, the digital light processing frame and the light-emitting diode frame comprises:
        generating, based on the determination that the vehicle is in the drive operating mode and the road information data, a light-emitting diode frame configured to cause the one or more light-emitting diode controllers to control the pixelated light source to illuminate a roadway; and
        generating, based on the determination that the vehicle is in the drive operating mode and the road information data, a digital light processing frame configured to cause the one or more digital light processing controllers to control the plurality of digital micromirrors to illuminate the roadway.

20. The method of claim 18, further comprising receiving, from a driver, a selection of an image,
    wherein generating the digital light processing frame and the light-emitting diode frame comprises:
        generating a light-emitting diode frame configured to cause the one or more light-emitting diode controllers to control the pixelated light source to display the selected image; and
        generating a digital light processing frame configured to cause the one or more digital light processing controllers to control the plurality of digital micromirrors to display the selected image.

21. The method of claim 20,
    wherein determining the operating mode of the vehicle comprises determining that the vehicle is not in the drive operating mode, and
    wherein generating, based on the operating mode of the vehicle and the road information data, the digital light processing frame and the light-emitting diode frame comprises:
        generating, based on the determination that the vehicle is not in the drive operating mode and the road information data, a light-emitting diode frame configured to cause the one or more light-emitting diode controllers to control the pixelated light source to display the selected image; and generating, based on the determination that the vehicle is not in the drive operating mode and the road information data, a digital light processing frame configured to cause the one or more digital light processing controllers to control the plurality of digital micromirrors to display the selected image.

22. The method of claim 18,
wherein the drive operating mode of the vehicle comprises an in-motion operating mode of the vehicle, and
wherein the stationary operating mode of the vehicle comprises one or more of a parked operating mode of the vehicle or a neutral operating mode of the vehicle.

* * * * *